June 1, 1926.
W. E. WINE
TRACTOR SHOE
Filed April 29, 1925
1,586,931
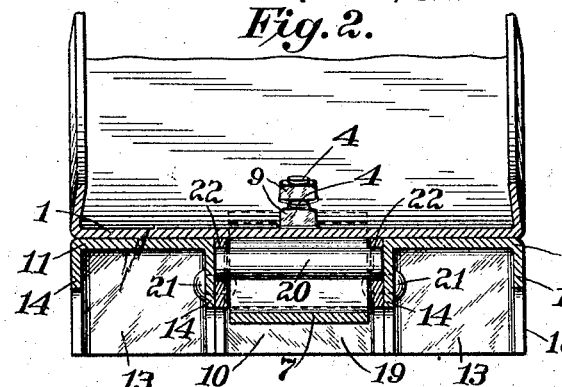
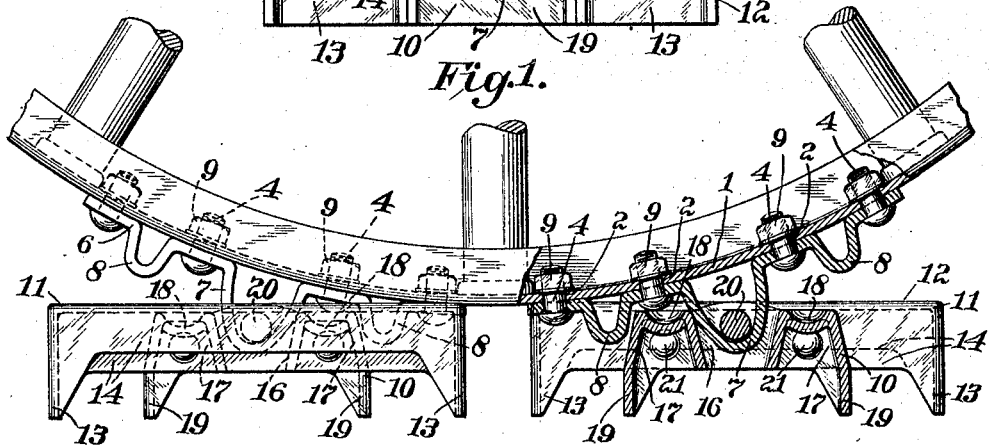
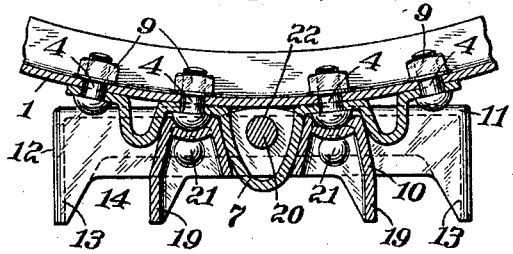
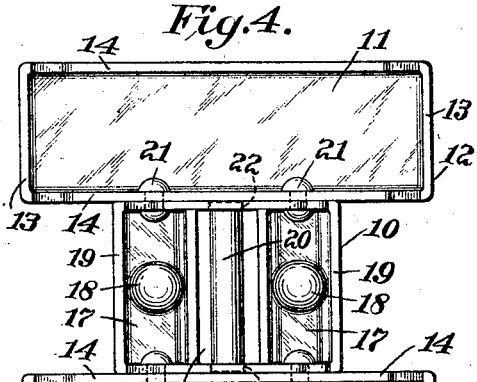
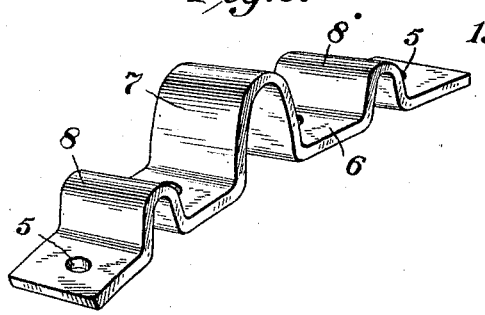
Inventor:
William E. Wine,
by Parker Cook
Atty.

Patented June 1, 1926.

1,586,931

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR SHOE.

Application filed April 29, 1925. Serial No. 26,697.

My invention relates to new and useful improvements in tractor shoes and the means for applying the same, and has for an object to provide an arrangement whereby a special form of retaining means may be quickly and readily applied to the rim of a tractor wheel, while associated with this retaining means in a special form of tread member, comprising two shoes and a spacer block.

Still another object of the invention is to provide a tractor shoe and its securing means wherein the tread member comprises two spaced shoes or feet which are riveted to the opposite sides of a spacer block, a pin being passed first through the retaining means so that after the two shoes are riveted to the spacer block, the tread member will be locked with relation to the retaining means.

Still another object of the invention is to provide a tread member comprising two oppositely positioned shoes and an intermediate spacer block with spikes or spurs formed on the front and rear of both shoes and also formed on the spacer block so that as each shoe contacts with the ground, six separate spikes will dig into the ground. These spikes will appear in a staggered relation, that is, first two widely separated, then two arranged in parallel relation, and then two in parallel relation to the first two, thereby providing a maximum gripping effort with the ground.

Still another object of the invention is to provide a tread member comprising two shoes or feet and a spacer block to which is rockingly secured a retaining means, the spacer block and retaining means having co-operating teeth so that as the wheel revolves and the load falls on the tread member, the intermeshing of the teeth will correctly position the shoe, allow the same to rock and oscillate and at the same time hold it in alignment and against lateral movement.

Still another object of the invention is to provide a tractor shoe wherein the tread members may be formed of pressed metal, the retaining means also formed of pressed metal and the spacer block be likewise formed, so that the device as a whole is one which is relatively strong and yet economical in the manufacture.

The present application is a companion application of several others filed by me, bearing serial numbers and filing dates as follows:—April 8, 1925, 21,609; April 15, 1925, 23,335; April 18, 1925, 24,049; April 20, 1925, 24,461.

Referring now to the drawings showing a preferred embodiment.

Fig. 1 is a side elevation of a fragmentary portion of a rim, showing two of the shoes attached to the rim, one of the shoes and retaining means being shown in elevation and the other in section.

Fig. 2 is a transverse sectional view showing the tread member contacting centrally throughout its width with the rim.

Fig. 3 is a sectional view showing the load directly above the shoe.

Fig. 4 is a bottom plan view of the tread member showing the spacer block and pin within the latter, and Fig. 5 is a perspective of the retaining means.

Referring now more specifically to the several views, there is shown a fragmentary portion of a rim 1 which is provided with a series of bolt holes 2 through which are designed to pass bolts 4, these bolts in turn passing through the holes 5 formed in the retaining member 6.

This retaining member 6 is preferably stamped from bar or sheet steel and has the large central hollow tooth 7 and the two oppositely arranged teeth 8, all of these teeth being pressed in the metal of the bar, which bar constitutes the retaining means.

Two holes 5, it will be noticed, are at the opposite ends of the retaining means 6, while two others are formed in the metal between the several teeth. Nuts 9 are shown for securely holding the bolts and retaining means in position.

Before this retaining means is bolted, however, to the rim of the wheel, it is secured within the spacer block 10, which in turn is riveted to the two shoes 11, the spacer block ond shoes constituting the tread member 12 as a whole.

Referring now for the moment to the tread member, and the parts constituting the same, I have shown two rectangular shoes or units 11 which are preferably formed of pressed metal, are box-like in construction, and open at their outer surface while the forward and rearward end of each shoe has the flange extending outwardly to form the spurs or spikes 13, designed to dig into the surface of the ground. Each shoe of the tread member, of course, has the side flanges 14 and to the adjacent side flanges 14 of the two shoes is riveted the rectangular spacer block 10 which is slightly greater in width than the width of the shoes, but less in length, so that the tread member as viewed from the top or bottom is substantially H-shaped.

This spacer block 10 has the central depression 16 open at its outer surface, the side walls of which form respectively one side wall for the teeth 17, while the crown of each tooth is depressed as at 18 so that the heads of the bolts 4 may fit within these depressions. In other words, the depressions 18 provide a clearance for the bolt heads, so that the rim of the wheel may rest on the inner surface of the two shoes of the tread member. This spacer block 10 is also set slightly below the inner surface of the tread member to provide for a similar clearance throughout, as may be seen from the several views.

It will be noticed that the spacer block has its inner opposite ends bent to form the remaining respective walls of the two teeth 17, while the lower ends of the spacer block are cut to form the two spurs or spikes 19.

The tread surface as a whole, therefore, when it digs into the ground will have a gripping action at the several ends of the two feet, and at the two ends of the spacer block, thereby providing a maximum traction effect with the ground.

Before the spacer block is riveted to the adjacent sides of the two shoes 11, however, a pin 20 is passed through the tooth 7 of the retaining means, after which the rivets 21 will be driven through the side walls of the spacer block and the adjacent sides 14 of the two shoes 11, thereby securing the retaining means to the tread member, openings or holes 22, of course, being provided in the side walls of the spacer block, so that the pin may pass through the same and contact with the side walls 14 of the tread member. After this spacer block has thus been riveted to the two feet, the pin 20 cannot release itself from its position, nor can it be removed unless the rivets 21 are cut. To secure the retaining member to the rim of the wheel, it will simply be necessary to tilt the tread member and put in two bolts and again tilt and put in the remaining two.

After the shoes are attached, it will be seen that the several teeth on the retaining means mesh with the teeth formed on the spacer block, thus correctly positioning the shoe in its movement, preventing lateral movement of the shoe and holding the shoe in its correct position with regard to the retaining means.

It will also be noticed that there is relatively little wear on the pin as when the tread member is in the position as shown in Fig. 3, the load is transferred to the tread member and the load on the pin is simply the weight of the shoe or tread member as it is carried about the periphery of the wheel.

As may be seen from either of the two shoes in Fig. 1, the respective teeth are not always in engagement during the revolution of the wheel and as the shoes are elevated and lowered, any dirt within the spaces between the teeth will jar and probably be dislocated so that the contacting surfaces of the teeth have a tendency to clean themselves.

From the foregoing it will be seen that I have devised a very practical and economical tractor shoe, all of the parts being formed of pressed metal and the several parts readily assembled and easily applied to the rim of the wheel.

Furthermore, by providing the teeth on the several parts, the shoe is held from lateral movement or from wobbling and properly aligns itself throughout its movement and at the same time, the load is transferred to a relatively large surface rather than directly to any point or points, thus greatly enhancing the life of the shoe.

Many slight changes might be made without in any way departing from the spirit and scope of the invention.

Having thus described my invention, what I claim as new and desire to secure by Letters Patent is:

1. A tractor shoe comprising a retaining means adapted to be rigidly secured to the rim of a wheel, and a tread member comprising three rectangular units riveted to each other and substantially H shape in plan view and said tread member secured by said retaining means.

2. A tractor shoe comprising a tread member, said tread member formed of three pressed units open at their outer surfaces, each of which is rectangular in form and one of said units riveted to the other of the said units to form the tread member H-shape in plan, a retaining means fitting within the center one of said units to rockably secure the tread member, and said retaining means adapted to be secured to the rim of a wheel.

3. A tractor shoe comprising two units and a spacer block rigidly secured between the same, a retaining means rockingly locked to said spacer block and said retaining means adapted to be secured to the rim of a wheel.

4. A tractor shoe comprising two spaced units and a spacer block secured between the same, the tractor shoe as a whole substantially in the form of the letter H, a retaining means fitting within this spacer block and a trunnion rockably holding said retaining means within said spacer block to allow the tractor shoe as a whole to rock with relation to the retaining means, and said retaining means adapted to be rigidly secured to the rim of a wheel.

5. A tractor shoe comprising a tread member, said tread member comprising two units and a spacer block secured to the adjacent sides of said units, said spacer block provided with an opening, a retaining means having a central tooth fitting within said opening in the spacer block, and a pin passing through said tooth and rockably locking the tread member to the retaining means, and said retaining member adapted to be bolted to the rim of the wheel.

6. A tractor shoe comprising a tread member, said tread member comprising two rectangular units and a spacer block riveted between the adjacent sides of said units, said spacer block having two teeth and a central opening, a retaining means comprising a plurality of teeth designed to mesh with the teeth in the spacer block, the central tooth passing within the opening of said spacer block, means extending across the said spacer block and within the central tooth for securing the tread member to the retaining means, and said retaining means adapted to be secured to the rim of the wheel.

7. A tractor shoe comprising a tread member, said tread member comprising two units and an interposed spacer block, a retaining means adapted to be bolted to the rim of a wheel, said spacer block provided with a central opening and oppositely disposed teeth, said retaining means comprising a plurality of teeth, one of which fits within the opening in the spacer block, and means for holding the tread member loosely to said retaining means.

8. A tractor shoe comprising a tread member formed of two units and an interposed spacer block, said spacer block provided with an opening and a tooth disposed opposite the opening, a retaining means comprising a central tooth for fitting within said opening, means extending through said tooth and across the opening in the spacer block to thereby rockably hold the tread member to said retaining means, and said retaining means adapted to be rigidly secured to the rim of a wheel.

9. A tractor shoe comprising in part a tread member, said tread member comprising two units and a spacer block secured between said units, said units and spacer block forming the tread member in the shape of the letter H said spacer block having a central opening and a locking bar fixed within said opening.

10. A tractor shoe comprising in part a tread member formed of a spacer block and two shoes riveted thereto, outwardly projecting teeth formed in the spacer block and the adjacent walls of the teeth forming a pocket, said pocket being open at its bottom, a cross bar extending across said pocket and a retaining means adapted to fit within said pocket and be held form disengagement by said cross bar.

11. A tractor shoe comprising a retaining means adapted to be secured to the rim of a wheel and having a plurality of teeth of different height, a tread member provided with an opening and teeth of the same height, one of the teeth of the retaining means rockably held within the opening in the tread member, and the remaning teeth meshing when the tractor shoe is supporting the load.

12. A tractor shoe comprising a tread member, formed of two units and a spacer block interposed between the same, said spacer block having two inwardly extending teeth, the crowns of which are concave, said spacer block having an opening formed in its inner surface between the two teeth, the walls of the opening forming side walls of the adjacent teeth, and the ends of said spacer block forming the remaining walls of said teeth, a retaining means adapted to be bolted to the rim of a wheel and the heads of the bolts fitting within the crowns of the teeth, and a projection on the retaining means fitting within the opening in the spacer block, and means for locking the same within the opening and to allow the tread member to oscillate with relation to the retaining means.

In testimony whereof I affix my signature.

WILLIAM E. WINE.